C. D. TOMPKINS.
VEHICLE RAISER.
APPLICATION FILED MAY 26, 1914.
1,146,671.
Patented July 13, 1915.
2 SHEETS—SHEET 1.
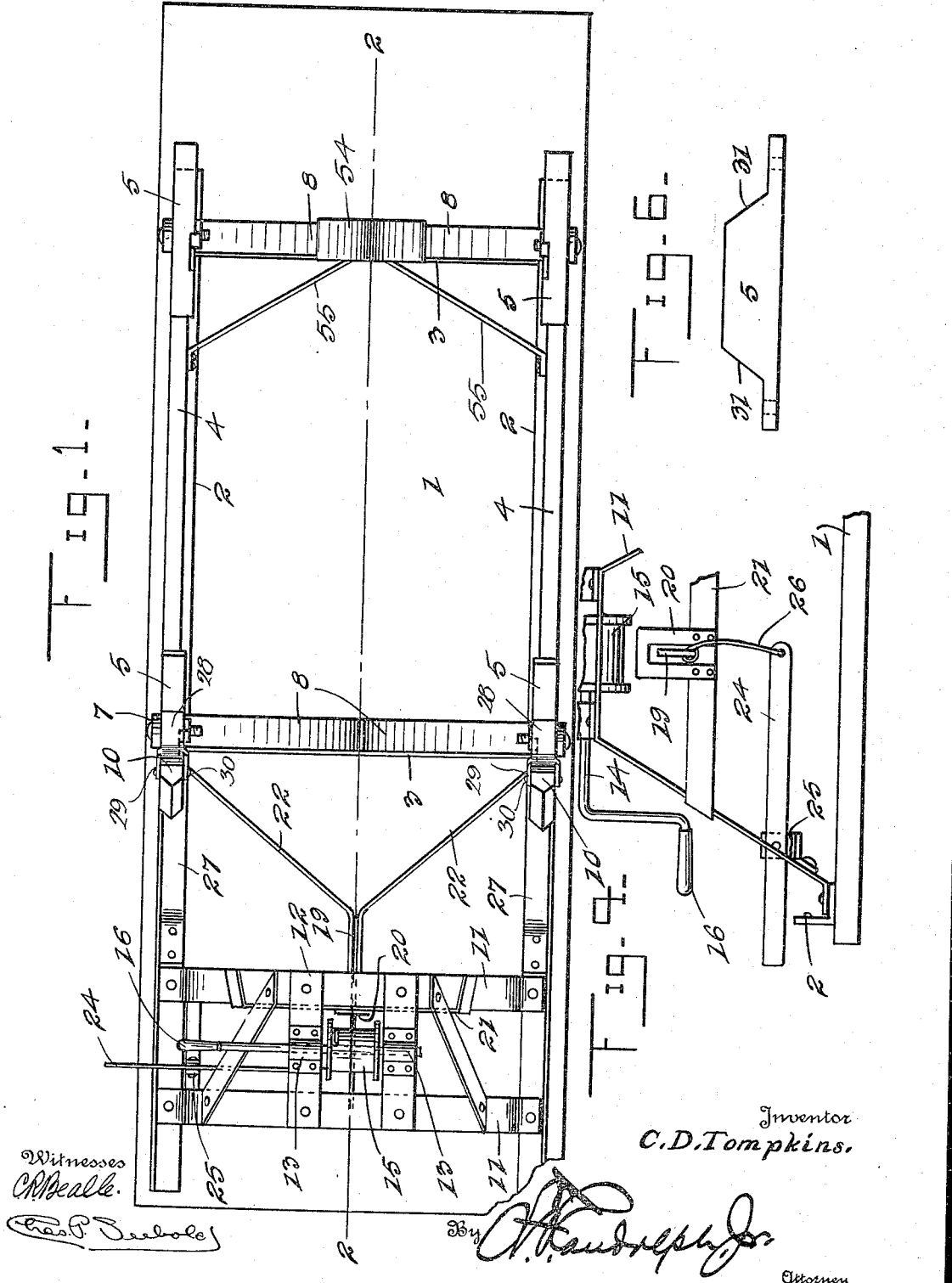
Witnesses
C. R. Beall
Chas. P. Subold
Inventor
C. D. Tompkins.
By [signature]
Attorney

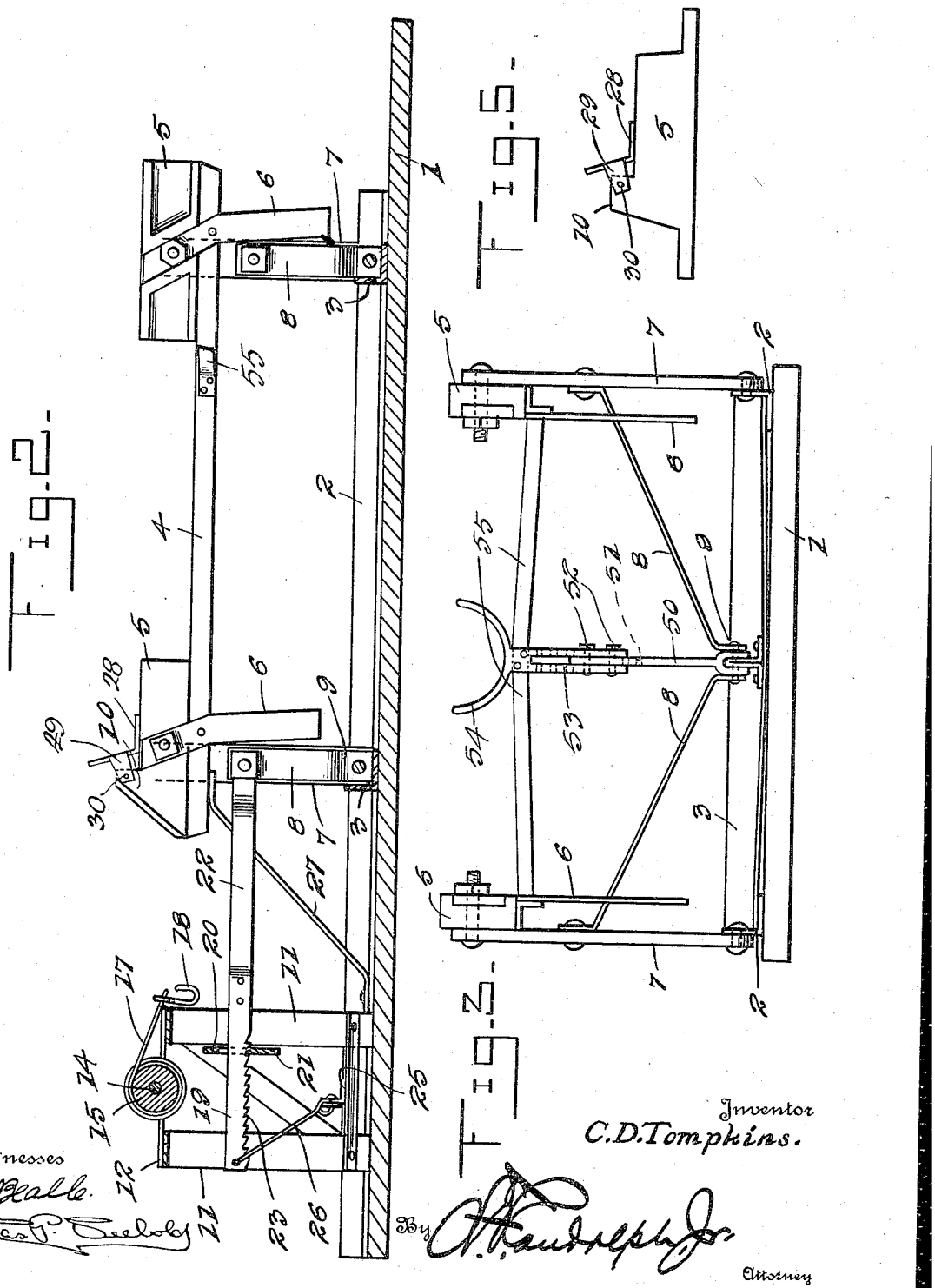

UNITED STATES PATENT OFFICE.

CHARLES D. TOMPKINS, OF VERMILLION, KANSAS.

VEHICLE-RAISER.

1,146,671.

Specification of Letters Patent. Patented July 13, 1915.

Application filed May 26, 1914. Serial No. 841,012.

*To all whom it may concern:*

Be it known that I, CHARLES D. TOMPKINS, a citizen of the United States, residing at Vermillion, in the county of Marshall and State of Kansas, have invented certain new and useful Improvements in Vehicle-Raisers; and I do hereby declare the following to be a full, clear, and exact description of the invention, such as will enable others skilled in the art to which it appertains to make and use the same.

This invention relates to a vehicle raiser especially adapted for raising motor vehicles, although it is not necessarily limited to such use.

The primary object of the invention is the provision of means for raising and supporting motor vehicles in elevated position during inoperation, so as to relieve the pneumatic tires of the weight of the vehicle and thus prolong their life.

Another object is to provide a vehicle raiser having abutments adapted to be struck by a moving vehicle to automatically carry the latter to elevated position by its own momentum.

Another object is to provide means for automatically locking the raiser to support the vehicle in elevated position.

Another object is the provision of means for manually operating the vehicle raiser to elevate or raise the vehicle.

With these and other objects in view, the invention consists in the novel construction, arrangement and formation of parts as will be hereinafter specifically described, claimed and illustrated in the accompanying drawings, in which, Figure 1 represents a top plan view of the vehicle raiser. Fig. 2 represents a longitudinal sectional view therethrough taken on the line 2—2 of Fig. 1. Fig. 3 represents a rear elevation. Fig. 4 represents a front elevation, partly broken away, and, Fig. 5 represents a side elevation of one of the front axle engaging blocks removed, and Fig. 6 represents a side elevation of a modified type of rear axle engaging block removed.

Referring to the drawing in detail, wherein similar reference numerals designate corresponding parts throughout the several views, the numeral 1 indicates a suitable base on which is secured a pair of longitudinal base rails 2, preferably formed of angle irons rigidly secured on top of the base 1 adjacent the longitudinal edges of the latter. The base rails 2 are connected at intervals by transverse brace bars 3, also preferably formed of angle irons.

A movable frame structure consisting of longitudinal connecting beams 4 carrying axle engaging blocks 5 and depending legs 6 is disposed above the base 1 and pivotally connected therewith by the bars 7 pivoted at their upper and lower ends to the blocks 5 and base rails 2, respectively. Each of the bars 7 is braced and pivotally connected with the medial portion of one of the transverse bars 3 by braces 8 extending inwardly from the block 7 and having pivotal connection with an upstanding bracket 9 carried by each brace bar 3. Enlargements 10 are formed integral with the front axle engaging blocks 5 and L shaped members 28 are pivotally secured thereto by spaced parallel ears 29 secured to said enlargements at 30.

The rear bracket 9 pivotally supports a bar 50 having a plurality of longitudinally spaced apertures 51 adapted to receive a pair of bolts 52 positioned through two of a plurality of apertures formed in the spaced depending arms 53 of a cup shaped differential engaging member 54 whereby said cup member may be adjusted various distances above the base 1. Braces 55 are connected with the upper end of the arms 53 and extend forwardly and outwardly and connect with the beams 4 for supporting and bracing the differential engaging cup in operative position.

A frame consisting of a pair of standards 11 is secured adjacent the front end of the base 1 and includes suitable horizontally disposed connecting and bracing strips 12 on which are secured suitable bearing blocks 13. A shaft 14 is rotatably journaled in the bearing blocks 13 and carries adjacent one end a drum 15 disposed between the bearing blocks 13. A suitable operating crank 16 is secured to the outer end of the shaft 14. A rope or cable 17 is fixed at one end to the drum 15 and carries at its opposite end a hook 18.

A rack bar 19 is slidably mounted through a suitable guide or keeper 20 secured on a brace 21 of the frame 11 and is bifurcated at its rear end as at 22 and such bifurcations are pivotally connected with the front pivoted supporting bars 7. Teeth 23 are formed on the underside of the rack bar 19 and are adapted to coöperate with the top edge of the brace 21 to lock said bar together with the vehicle raising and supporting frame in adjusted position. A lever or pedal 24 is pivotally mounted in the bracket 25 carried by the bars 11 and is connected with the extreme forward end of the rack bar 19 by the link 26. Inclined stop bars 27 are secured to the base 1 and are adapted to be engaged by the pivoted supporting bars 7 to limit the forward movement of said bars and the frame pivotally supported thereby.

The legs 6 of the raising and supporting frame are intended to support the latter in lowered position, in which position the supporting rods 7 are slightly inclined from the vertical. It will be understood that the pairs of front and rear axle engaging blocks 5 are spaced apart transversely of the base 1, the proper distance to be received between the wheels of vehicles of various sizes.

In operation: The motor vehicle or other vehicle to be elevated is driven at a reduced speed over the raising and supporting frame of the raiser. Parts of the steering mechanism of the motor vehicle, which are ordinarily located in front of the front axle, strike the vertically disposed parts of the L shaped members 28 and rock the latter upon their pivotal axes 30 to raise the rear portions of said members into vertical position to form continuations of the rear vertical faces of the enlargements 10 for engagement with the front axle of the vehicle. When the front axle engages the members 28 and the enlargements 10 the momentum of the vehicle carries the frame a distance forwardly until the bars 7 assume a vertical position as illustrated in Fig. 2. At this point the front bars 7 strike and are stopped by the stop bars 27. The raising and supporting frame of the raiser is held in elevated position and prevented from rebounding rearwardly by the gravity actuated rack bar 19, the teeth of which are automatically locked by the brace 21. To release the frame and permit the latter together with the vehicle supported thereby to lower, the lever or pedal 24 is depressed at its outer end, thus raising the rack bar 19 through the link 26, and disengaging the teeth 23 from the edge of the brace 21.

The raiser is manually operable to elevate a vehicle by the crank 16, drum 15 and cable 17. The hook 18 of the cable 17 is preferably attached to the front axle or adjacent portion of the vehicle chassis and the crank 16 rotated to wind the cable 17 upon the frame 15, thus carrying the supporting frame and vehicle to an elevated position.

What I claim is:—

1. A device of the character described comprising a base, a frame, bars pivotally connecting said frame to said base, vehicle engaging abutments on said frame, a gravity actuated rack bar pivoted to several of said bars, means for engaging the teeth of said bar to lock said frame in elevated position, and manually operable means to release said rack bar.

2. A device of the character described comprising a base, a frame, bars pivotally connecting said frame with said base, a manually operable drum rotatably mounted in the forward end of said base, a flexible connection secured at one end to said drum, a vehicle-engaging hook carried by the opposite end of said connection, and a gravity actuated rack bar pivotally secured to said frame and adapted to coöperate with parts of said base to hold said frame in elevated position.

3. A device of the character described comprising a base, a frame, a plurality of bars pivotally connecting said frame to said base and arranged in pairs, braces secured to said bars and extending downwardly and inwardly toward the center of said base, means pivotally securing the lower extremities of said braces, means for retaining said bars in vertical position, blocks secured to the top of said frame, and legs carried by said blocks adapted to support said frame in lowered position.

4. A device of the character described comprising a base, a frame, bars pivotally connecting said base with said frame, blocks secured to said frame, and pivoted axle-engaging abutments on said blocks.

5. A device of the character described comprising a base, a frame, bars pivotally connecting said base with said frame, blocks secured to said frame, and L-shaped vehicle-engaging members pivotally secured to said blocks.

6. In a device of the character described, a base, a frame, bars pivotally connecting said base with said frame, blocks secured to said frame, abutments on said blocks, and L-shaped members pivotally secured to said abutments.

In testimony whereof I affix my signature in presence of two witnesses.

CHARLES D. TOMPKINS.

Witnesses:
P. H. HYBSKMANN,
F. J. NASH.